United States Patent [19]

Lindsay

[11] Patent Number: 5,549,199

[45] Date of Patent: Aug. 27, 1996

[54] COMPACT DISC STORAGE CASE

[76] Inventor: Joseph A. Lindsay, 1812 Green Acres, Metairie, La. 70003

[21] Appl. No.: 539,361

[22] Filed: Oct. 5, 1995

[51] Int. Cl.⁶ .................................................. B65D 85/57
[52] U.S. Cl. ........................................ 206/308.1; 220/346
[58] Field of Search ................................ 206/307, 307.1, 206/308.1, 309, 310, 311, 312, 313; 220/345, 346

[56] References Cited

U.S. PATENT DOCUMENTS

| | | | |
|---|---|---|---|
| 4,615,461 | 10/1986 | Liu | 220/345 X |
| 4,702,372 | 10/1987 | ACkeret | 206/309 X |
| 5,360,107 | 11/1994 | Chasin et al. | 206/308.1 X |
| 5,474,174 | 12/1995 | Lin | 206/308.1 X |

Primary Examiner—Jacob K. Ackun
Attorney, Agent, or Firm—Joseph N. Breaux

[57] ABSTRACT

A compact disc storage case of the type having a cover section slidably connected to a compartment section. The compact disc storage case comprises: a compartment section having a top surface forming a substantially cylindrical storage recess and two parallel outer sides each forming a substantially rectangular, horizontal track terminating in a vertical section oriented downwardly; a cover section having a planar top wall and two parallel side walls extending downwardly therefrom; and a square peg extending from each side wall in a manner such that the square pegs are oriented along the same line and toward one another, each peg being entrapped within one of the horizontal tracks in a manner such that the cover section is slidable with respect to the compartment section.

20 Claims, 2 Drawing Sheets

COMPACT DISC STORAGE CASE

TECHNICAL FIELD

The present invention relates to devices for storing a compact disc and more particularly to devices for storing a compact disc that have a cover section slidable in relation to a compartment section.

BACKGROUND ART

According to the conventional disc storage case, a main body of a container and its cover are connected by hinges. These hinges are often broken when the case is dropped or after the case is repeatedly opened and closed. In other storage cases a container section is slidably entrapped within an outer cover. In these storage cases it is often necessary to use two hands to open the case making the case inconvenient and unsafe for use in an automobile. In the previous storage cases it is also difficult to remove the compact disc from the container often resulting in damage to the compact disc.

It would be a benefit, therefore, to have a compact disc storage case that has a cover section which is slidable with relation to the compartment section by the use of one hand. It would be a further benefit, to have a compact disc storage case that is durable. It would be an additional benefit, to have a compact disc storage case that allows a user to easily access and remove the stored compact disc.

GENERAL SUMMARY DISCUSSION OF INVENTION

It is thus an object of the invention to provide a compact disc storage case that has a cover section slidably connected to a compartment section.

It is a further object of the invention to provide a compact disc storage case that has a compartment section that forms rectangular, horizontal tracks along its parallel outer sides.

It is a still further object of the invention to provide a compact disc storage case that has a cover section that has square pegs slidably entrapped within the horizontal tracks formed by the compartment section.

It is a still further object of the invention to provide a compact disc storage case that has a compartment section that forms a storage recess for disposing a compact disc and depressions in connection with the perimeter of the storage recess for access and easy removal of the compact disc.

Accordingly, a compact disc storage case of the type having a cover section slidably connected to a compartment section. The compact disc storage case comprises: a compartment section having a top surface forming a substantially cylindrical storage recess and two parallel outer sides each forming a substantially rectangular, horizontal track terminating in a vertical section oriented downwardly; a cover section having a planar top wall and two parallel side walls extending downwardly therefrom; and a square peg extending from each side wall in a manner such that the square pegs are oriented along the same line and toward one another, each peg being entrapped within one of the horizontal tracks in a manner such that the cover section is slidable with respect to the compartment section.

The compact disc storage case may be constructed of any rigid material, preferably, the compact disc storage case is constructed of a durable plastic. The compact disc storage case may be transparent or opaque. Preferably, the compact disc storage case is transparent for easy recognition of the compact disc stored therein.

The compact disc storage case may have a resilient plastic fixing component centered and extending from the cylindrical storage recess. The fixing component being elastically deformable for holding the compact disc thereon. The top surface may form depressions in connection with the perimeter of the storage recess for easy removal of the compact disc. The compartment section may form a pocket adjacent a front surface for holding an identification label.

The planar top member of the cover section is sized to cover at least the storage recess when the cover section is in the closed position. Preferably, the top member is sized to cover the entire top surface of the compartment section and adapted to mount flush against the top surface when in the closed position.

The parallel side walls may extend a portion of the length of the planar top member. Preferably, the parallel side walls extend the length of the cover section. The cover section may include a rear wall extending downwardly from the top wall and located at the opposite end of the cover section from the pegs. The rear wall may be in connection with the side walls. The cover section may further include a front wall extending downwardly from the top wall adjacent the pegs. The front wall being of a length to pass over the top surface of the compartment section when the cover is passed along the horizontal track.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
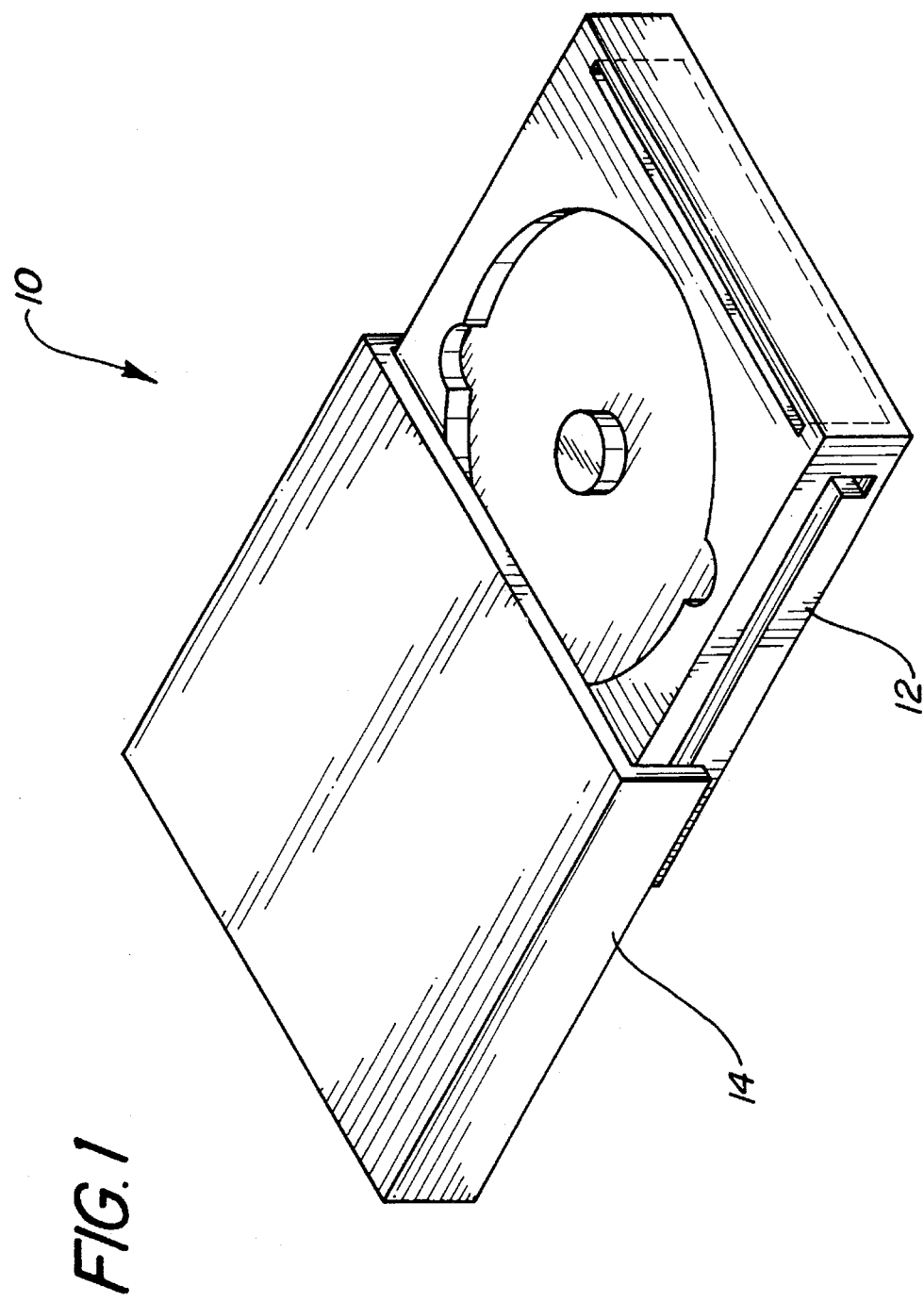
FIG. 1 is an isometric view of an exemplary embodiment of the compact disc storage case of the present invention.

FIG. 1 is an isometric view of an exemplary embodiment of the compact disc storage case of the present invention generally designated by the numeral 10. compact disc storage case 10 comprises a compartment section 12 and a cover section 14. Cover section 14 is slidably connected to compartment section 12.

Figure 2:
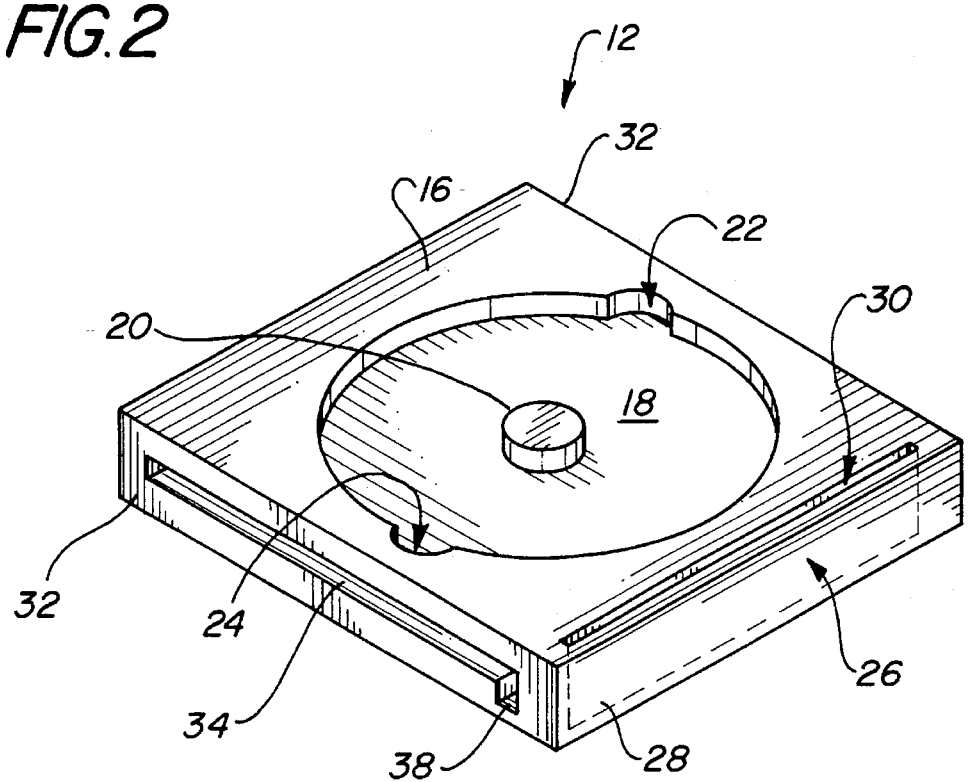
FIG. 2 is an isometric view of the compartment section in isolation.

FIG. 2 is an isometric view of compartment section 12 in isolation. Compartment 12 is generally square and formed of a rigid, transparent plastic using a molding technique. The top surface 16 of compartment 12 forms a cylindrical storage recess 18. Storage recess 18 has a diameter slightly greater than that of a standard compact disc. A fixing component 20, formed of a resilient plastic, extends from the center of storage recess 18. Fixing component 20 is elastically deformable for disposal through the center hole of a compact disc (not shown) holding the compact disc thereon. Compartment section 12 forms a first and second depression 22,24 having a portion in connection with the perimeter of storage recess 18 to allow for easy removal of a compact disc from storage recess 18.

Compartment section 12 forms a pocket 26 for placing an identification label therein adjacent to front surface 28. Top surface 16 forms a slot 30 providing access to pocket 26.

Compartment section 12 has two parallel outer sides 32. Outer sides 32 each form a rectangular, horizontal track 34. Each track 34 terminates in a rectangular, vertical section 38 oriented downwardly.

Figure 3:
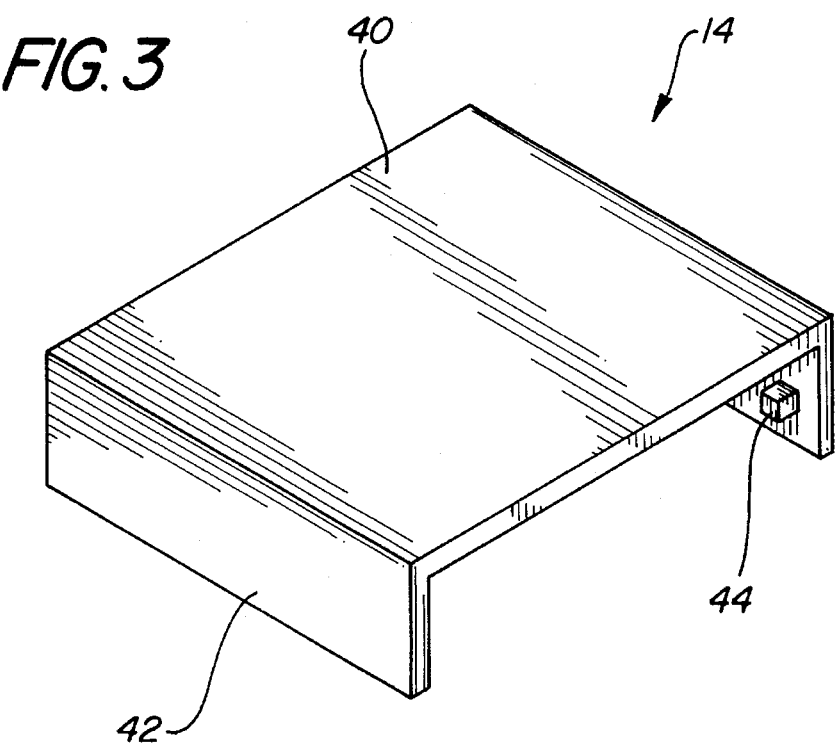
FIG. 3 is an isometric view of the cover section in isolation.

FIG. 3 is an isometric view of cover section 14 in isolation. Cover section 14 is constructed of a transparent, rigid plastic. Cover section 14 has a planar top wall 40 sized to cover top surface 16 of compartment section 12 (FIG. 2). A pair of parallel side walls 42 extend downwardly from top wall 40. Each side wall having a square peg 44 extending therefrom in a manner such that pegs 44 are oriented along the same line and toward one another. Square pegs 44 are sized to slidably pass within tracks 34 (FIG. 2) without rotating.

Use of the compact disc storage case is now described with reference to FIGS. 1–3. A compact disc (not shown) may be placed within storage recess 18 with fixing component 20 disposed through the center hole of the compact disc. Resilient fixing component 20 is elastically deformable for retaining the compact disc thereon. An identification label (not shown) may be inserted through slot 30 into pocket 26 so as to be visible through front surface 28.

In a closed position, planar top wall 40 of cover section 14 covers and is flush against top surface 16 of compartment section 12 with pegs 44 slidably disposed within vertical sections 38 of track 34. To retrieve or replace a compact disc, cover section 14 is moved to the open position by urging top wall 40 from compartment section 12 and sliding pegs 44 along horizontal track 34.

It can be seen from the preceding description that a device for storing a compact disc which has a cover section slidably connected to a compartment section, has a compartment section that forms rectangular, horizontal tracks along its parallel outer sides, has a cover section that has square pegs slidably entrapped within the horizontal tracks formed by the compartment section, and that has a compartment section that forms a storage recess for disposing a compact disc and depressions in connection with the perimeter of the storage recess for access and easy removal of the compact disc has been provided.

It is noted that the embodiment of the compact disc storage case described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A compact disc storage case comprising:
   a compartment section having a top surface forming a substantially cylindrical storage recess and two parallel outer sides each forming a substantially rectangular, horizontal track terminating in a vertical section oriented downwardly;
   a cover section having a planar top wall and two parallel side walls extending downwardly therefrom; and
   a square peg extending from each said side wall in a manner such that said square pegs are oriented along the same line and toward one another, each said peg being entrapped within one said horizontal track in a manner such that said cover section is slidable with respect to said compartment section.

2. The compact disc storage case of claim 1, further including:
   a fixing component centered and extending from said storage recess adapted for disposing through a center hole of a compact disc holding said compact disc thereon.

3. The compact disc storage case of claim 2, wherein:
   said fixing component is constructed of a resilient material elastically deformable for holding said compact disc thereon.

4. The compact disc storage case of claim 1, wherein:
   said top surface of said compartment section forms a depression in connection with a perimeter of said storage recess for access to remove a compact disc from said storage recess.

5. The compact disc storage case of claim 1, wherein:
   said compartment section forms a pocket adjacent a front surface of said compartment section for holding an identification label.

6. The compact disc storage case of claim 1, wherein:
   said compartment section is formed of a transparent material.

7. The compact disc storage case of claim 3, wherein:
   said top surface of said compartment section forms a depression in connection with a perimeter of said storage recess for access to remove said compact disc from said storage recess.

8. The compact disc storage case of claim 3, wherein:
   said compartment section forms a pocket adjacent a front surface of said compartment section for holding an identification label.

9. The compact disc storage case of claim 8, wherein:
   said compartment section is formed of a transparent material.

10. A compact disc storage case comprising:
    a compartment section having a top surface forming a substantially cylindrical storage recess and two parallel outer sides each forming a substantially rectangular, horizontal track terminating in a vertical section oriented downwardly;
    a fixing component centered and extending from said storage recess, said fixing component being elastically deformable for disposing through a center hole of a compact disc holding said compact disc thereon;
    a depression formed by said top surface of said compartment section in connection with a perimeter of said storage recess for access to remove said compact disc from said storage recess;
    a cover section having a planar top wall and two parallel side walls extending downwardly therefrom; and
    a square peg extending from each said side wall in a manner such that said square pegs are oriented along the same line and toward one another, each said peg being entrapped within one said horizontal track in a manner such that said cover section is slidable with respect to said compartment section.

11. The compact disc storage case of claim 10, wherein:
    said compartment section forms a pocket adjacent a front surface of said compartment section for holding an identification label.

12. The compact disc storage case of claim 11, wherein:
    said compartment section is formed of a transparent material.

13. The compact disc storage case of claim 12, wherein said cover section further includes:

a rear wall extending downwardly from said planar top wall, said rear wall being located at an opposite end of said cover section from said pegs.

14. The compact disc storage case of claim 12, wherein said cover section further includes:

a rear wall extending downwardly from said planar top wall, said rear wall being located at an opposite end of said cover section from said pegs.

15. The compact disc storage case of claim 10, wherein said cover section further includes:

a front wall extending downwardly from said planar top wall adjacent said pegs.

16. The compact disc storage case of claim 14, wherein said cover section further includes:

a front wall extending downwardly from said planar top wall adjacent said pegs.

17. A compact disc storage case comprising:

a compartment section having a top surface forming a substantially cylindrical storage recess and two parallel outer sides each forming a substantially rectangular, horizontal track terminating in a vertical section oriented downwardly;

a fixing component centered and extending from said storage recess, said fixing component being elastically deformable for disposing through a center hole of a compact disc holding said compact disc thereon;

a depression formed by said top surface of said compartment section in connection with a perimeter of said storage recess for access to remove said compact disc from said storage recess;

a pocket formed by said compartment section adjacent a front surface of said compartment section for holding an identification label;

a cover section having a planar top wall and two parallel side walls extending downwardly therefrom; and a square peg extending from each said side wall in a manner such that said square pegs are oriented along the same line and toward one another, each said peg being entrapped within one said horizontal track in a manner such that said cover section is slidable with respect to said compartment section.

18. The compact disc storage case of claim 17, wherein:

said compartment section is formed of a transparent material.

19. The compact disc storage case of claim 18, wherein said cover section further includes:

a rear wall extending downwardly from said planar top wall, said rear wall being located at an opposite end of said cover section from said pegs.

20. The compact disc storage case of claim 19, wherein said cover section further includes:

a front wall extending downwardly from said planar top wall adjacent said pegs.

* * * * *